United States Patent Office 3,481,384
Patented Dec. 2, 1969

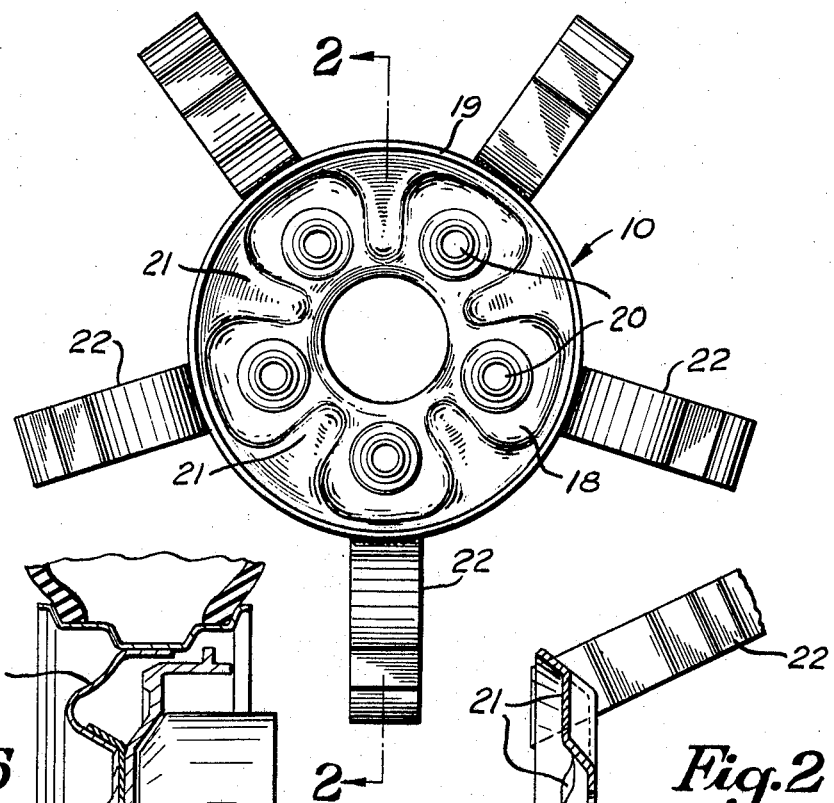
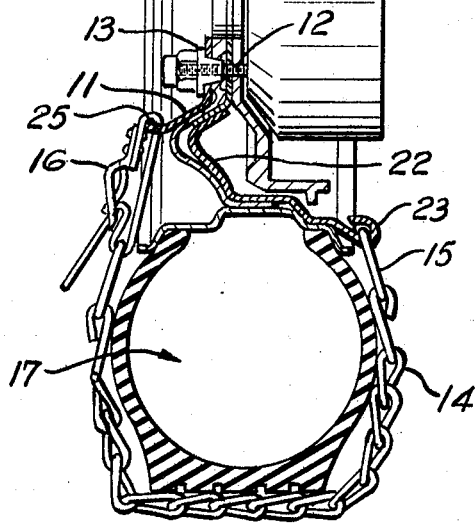
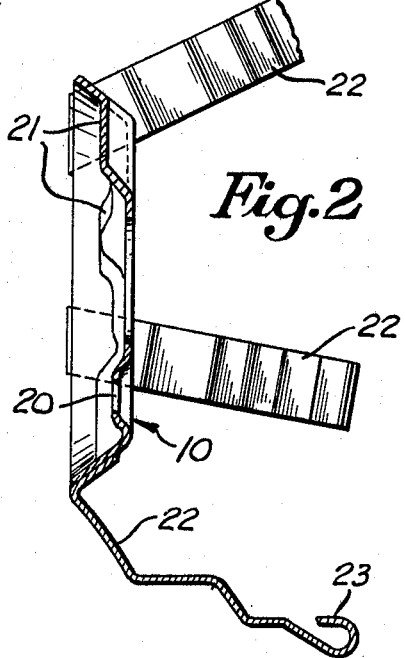

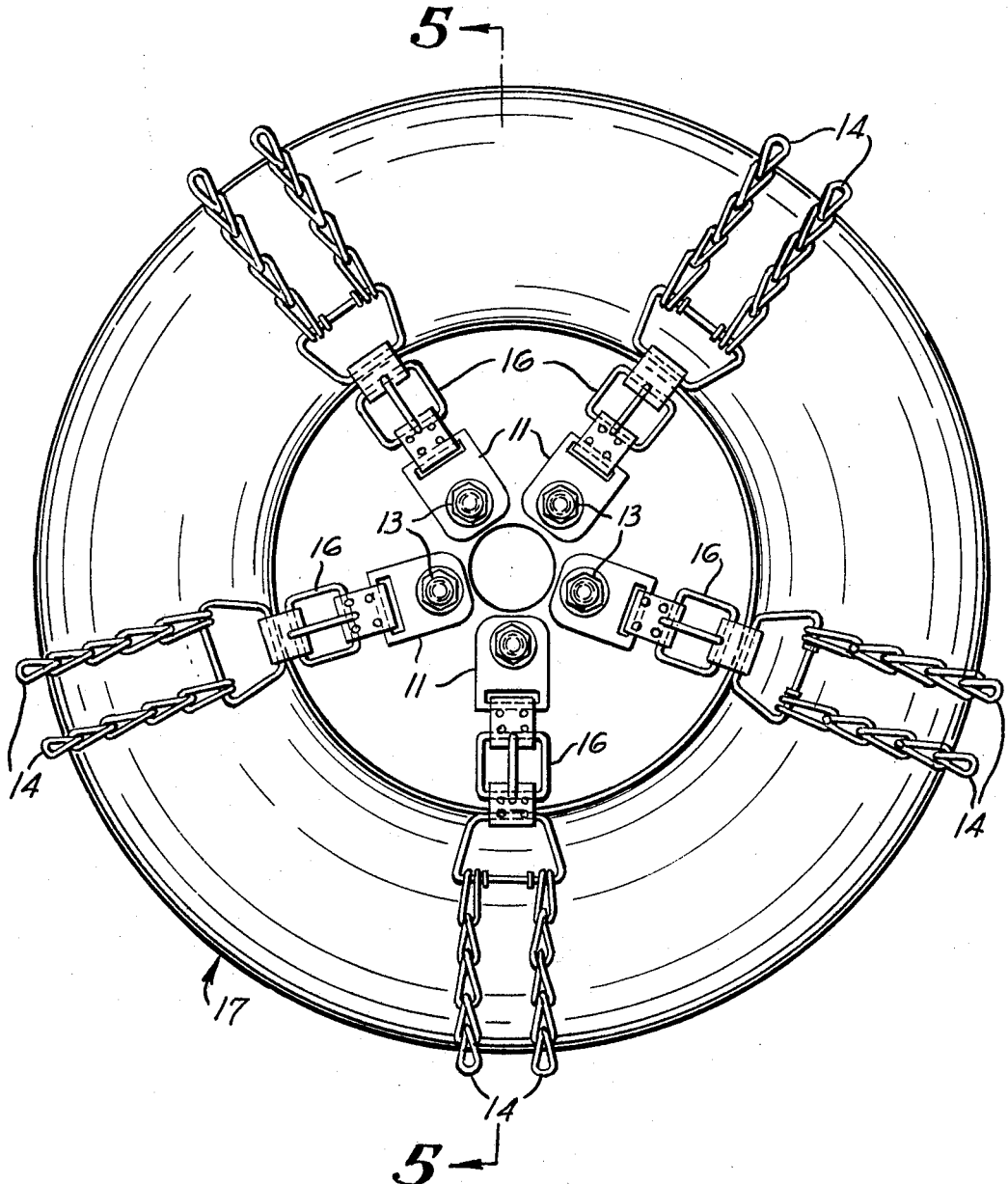

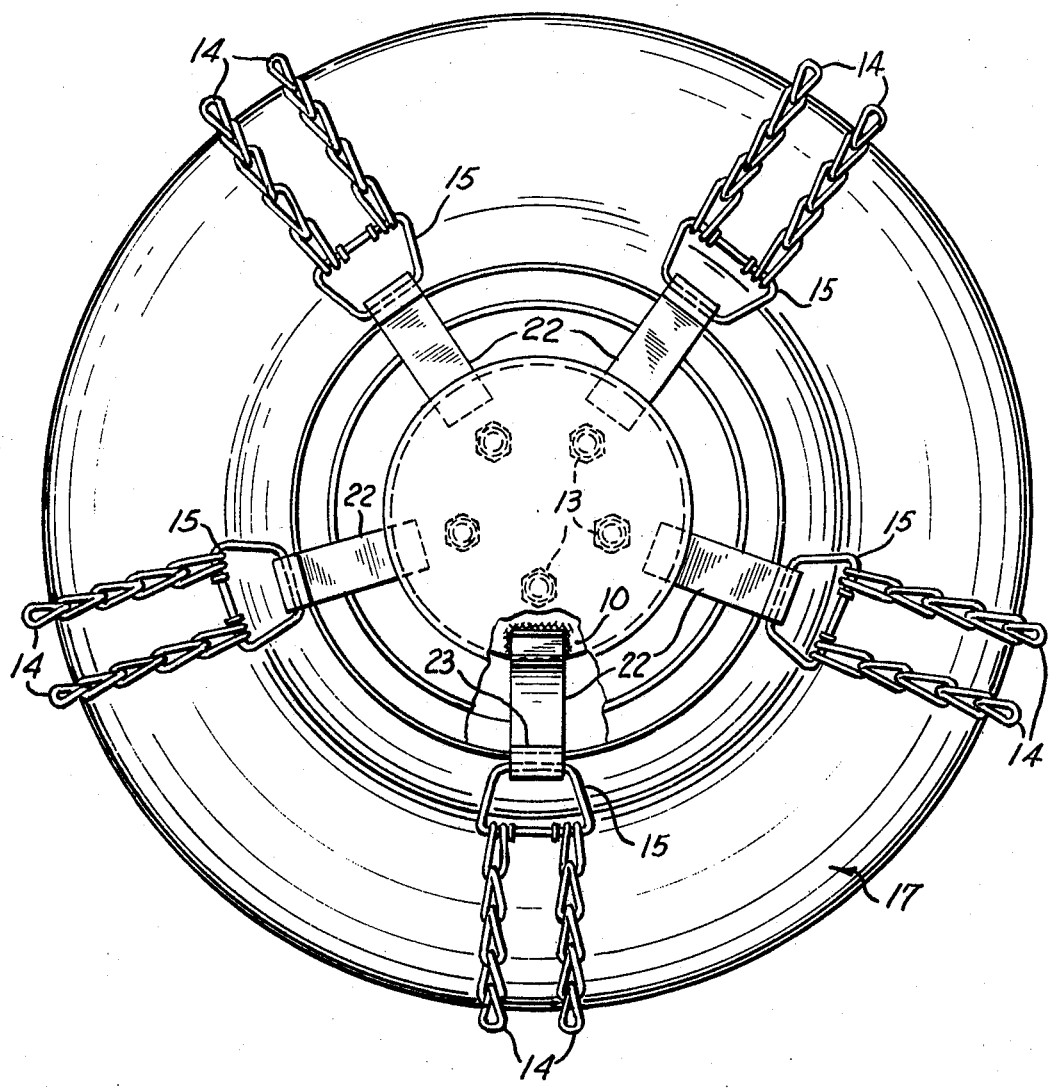

3,481,384
SNOW CHAINS AND THEIR CARRIERS
Benito Triglia, 11 Pine Ave., Ossining, N.Y. 10562
Filed Sept. 29, 1967, Ser. No. 671,774
Int. Cl. B60c 27/02
U.S. Cl. 152—233                              1 Claim

ABSTRACT OF THE DISCLOSURE

A device for carrying snow chains includes an adapter conforming to the shape of the wheel hub and provided with hooks. This adapter may be permanently fixed to the wheel with the hooks located on the inside of the wheel. Hooked clips may be permanently fixed by shank nuts to the wheel stud bolts. Standard snow chains are provided with strap and buckle or the like and are mounted on links for attachments to the inner and outer hooks. The number of chains with which each wheel can be provided is equal to the number of hook pairs adapted to carry the chains.

---

This invention relates to snow chains for the tires of wheels of various automotive vehicles, such as automobiles, buses, trucks, etc. and refers more particularly to a device for attaching the chains to the wheels.

An object of the present invention is the provision of a device for easily and quickly installing snow chains on all types of wheels without it being necessary to jack up the wheels or to use any tools and for quickly removing the chains.

Another object is the provision of snow chains which can be adapted to varying road conditions by being arranged in sets of cross chain members, whereby the user can apply only one set or attach multiple sets to provide various amounts of traction.

Yet another object is the provision of snow chains which can be used as a most effective substitute for snow tread tires.

Other objects of the present invention will become apparent in the course of the following specification In the accomplishment of the objectives of the present invention it was found desirable to provide parts which can be permanently attached to the wheels of a vehicle irrespective as to whether or not the snow chains are used. These parts consist of a spider-like adapter conforming to the shape of the wheel hub and having hooks located on the inside of the wheel as well as hooked clips attached by tapered shank nuts to the wheel stud bolts. The hooked clips and the hooks of the adapter are located substantially opposite each other. Each snow chain set is provided with links for attachment to the front and rear hooks. Furthermore, each snow chain set is provided with a heavy strap and buckle for pulling it tight. Since a wheel usually has five stud bolts, the user can install from one to five snow chains sets, depending on road conditions.

The invention will appear more clearly from the following detailed description when taken in connection with the accompanying drawings, showing by way of example, a preferred embodiment of the inventive idea.

In the drawings:

FIGURE 1 is a front view of the spider-like adapter of the present invention.

FIGURE 2 is a section along the line II—II of FIG. 1.

FIGURE 3 is an outside view of an automobile wheel provided with the snow chain carrying device of the present invention.

FIGURE 4 is a rear view of the same wheel.

FIGURE 5 is a section through the same wheel along the line V—V of FIG. 3.

As already stated, the device for attaching snow chains constituting the present invention includes parts which can be permanently attached to vehicle wheels even if no snow chains are used, as well as snow chain sets which are removably attached to these fixed parts.

The fixed parts comprise a wheel hub adapter 10 and hooked clips 11 attached to the wheel stud bolts 12 by tapered shank nuts 13.

The removable snow chains consists of set 14 of standard chains provided with links 15 and strap and buckle 16.

The adapter 10 is shown as a separate unit in FIGS. 1 and 2, while FIGS. 4 and 5 illustrate the adapter as mounted in an automobile wheel 17.

The adapter 10 may be made of pressed steel plate or any other suitable material; it includes a plate 18 with an upturned flange edge 19 and opens 20 for the bolts as well as curved raised portions 21 between the openings 20, Legs 22 have ends firmly connected or integral with flanged edge 19 of the plate 18. The outer ends of the legs 22 terminate in inner hooks 23.

The shape of the adapter 10 conforms exactly to the shape and contour of the wheel web 24. The legs 22 are located opposite each wheel bolt and are shaped to provide clearance for the wheel. When the adapter is mounted on the wheel the hooks 23 will be located on the inside of the wheel.

Hooked clips 11 are located opposite the adapter legs 22 on the outside of the wheel; they are provided with slits 25 through which the heavy strap and buckle 16 may be extended. They are fixed to the wheel stud bolts by the tapered shank nuts 13.

The snow chains 14 are of standard make and consist of elongated chain bodies provided at their ends with links 15. Preferably, each set of snow chains consists of two chains the ends of which are carried by the links 15. One of the links 15 is placed directly upon the hook 23 of the adapter 10 while the other link 15 is attached to the buckle and strap 16 which is attached to the hooked clip 11.

While the user may, if he so desires, attach the adapters 10 and clips 11 to the wheels of his car temporarily during a snow emergency and then remove them later on, obviously the better procedure is to leave permanently the adapters and clips upon the wheels even though they will be used only during the snow season, since the adapter and clips in no way interfere with the normal functioning of the wheels, including the operation of the brakes. The hooked clips 11 on the outside of the wheel are so located that they can be conveniently covered by the usual hub cap when not in use.

It is apparent that the adapter 10 fits the exact contour of the wheel web. The hooks 23 of the adapter are located substantially opposite the hooked clips 11. Therefore, in order to place a set of snow chains upon a wheel the user merely places a link 15 over a hook 23 of the adapter, then swings the chains around the wheel tire and attaches the buckle and strap 16 to the corresponding clip 11. Due to the location of the hook and clip the chains will always extend at right angles to the tire. By operating the strap and buckle, the chains can be made tight on the tire irrespective of air pressure in the tire, namely, whether the tire is hard or soft. As already stated, the snow chains can be quickly and easily applied and removed without raising the wheel and the user has the option of using one set of snow chains or several sets upon the same wheel.

It is apparent that the above example has been disclosed solely by way of illustration and not by way of limitation and that it is capable of many variations and modifications within the scope of the present invention. Since different types of vehicles have wheel hubs of different shapes, the adapter and the clips will be shaped differently for differently constructed wheels. They can be made of any suit able metal or other suitable material. The tightening of the snow chains can be made by any other suitable means instead of the illustrated strap and buckle. All such and other variations and modifications are to be included within the scope of the present invention.

What is claimed is:

1. A snow chain carrier for a vehicle wheel having stud bolts, said carrier comprising, in combination, a wheel hub adapter having a round plate with an upturned flanged edge, said plate having openings for the stud bolts and curved raised portions between said openings, and legs having inner ends fixed to the flanged edge of said plate, each of said legs being located opposite a separate opening and extending inwardly and angularly away from said plate, said legs having outer hook-shaped ends located upon the inside of the wheel for attachment of one of the ends of snow chains, and hooked clips for attachment of the opposite ends of snow chains, said hooked clips being mounted upon said stud bolts and located upon the outside of the wheel.

References Cited

UNITED STATES PATENTS

| | | | |
|---|---|---|---|
| 2,664,133 | 12/1953 | Eger | 152—336 |
| 2,751,958 | 6/1956 | Weddington | 152—233 |
| 2,975,815 | 3/1961 | Rettew | 152—236 |
| 3,032,090 | 5/1962 | Robinson | 152—237 |
| 3,151,655 | 10/1964 | Brown | 152—233 |

ARTHUR L. LAPOINT, Primary Examiner